United States Patent [19]

Belcher et al.

[11] Patent Number: 4,969,159
[45] Date of Patent: Nov. 6, 1990

[54] SPREAD SPECTRUM COMMUNICATION SYSTEM EMPLOYING COMPOSITE SPREADING CODES WITH MATCHED FILTER DEMODULATOR

[75] Inventors: Donald K. Belcher, West Melbourne; W. Scott Bradley, Palm Bay; Darrell R. Gimlin, Melbourne Beach; James P. Klaasen, Palm Bay, all of Fla.

[73] Assignee: Harris Corporation, Melbourne, Fla.

[21] Appl. No.: 326,988

[22] Filed: Mar. 22, 1989

[51] Int. Cl.$^5$ .............................................. H04K 1/00
[52] U.S. Cl. .......................................................... 375/1
[58] Field of Search .............................................. 375/1

[56] References Cited

U.S. PATENT DOCUMENTS

| | | | |
|---|---|---|---|
| 3,808,536 | 4/1974 | Reynolds | 375/1 |
| 4,225,935 | 9/1980 | Zscheile, Jr. et al. | 375/1 |
| 4,601,047 | 7/1986 | Horowitz et al. | 375/1 |
| 4,759,034 | 7/1988 | Nagazumi | 375/1 |
| 4,908,836 | 3/1990 | Rushfort et al. | 375/1 |

OTHER PUBLICATIONS

IEEE Trans. on Comm., vol. 36, No. 5 (5/5/88) pp. 564–576, Fischer et al., "Wide Band Packet Radio for Multipath Environments".
Proc. IEEE, vol. 75, No. 1, (1/87) pp. 33–42, Fifer, "The Low Cost Packet Radio".
1987 IEEE, pp. 86–90, Kavehrad et al., "Exp. with DSSS Using DPSK for Indoor Wireless Communication".
Elect. Eng. Labs, U. of Manchester M13, 9PL UK, 7 pages, Beale (1980), "A Class of Composite Sequences & its Implications for Matched Filter Processing".

Primary Examiner—Salvatore Cangialosi
Attorney, Agent, or Firm—Evenson, Wands, Edwards, Lenahan & McKeown

[57] ABSTRACT

A hybrid despread and demodulation receiver for low symbol rate communications employs a passive (SAW) matched filter to remove a "short" coding portion of a composite spreading code that has been used to spread the data signal. The composite spreading sequence is formed by multiplying different length coding sequences, thereby obtaining an overall signal processing operator the duration or symbol span of which is sufficient to maintain a high signal processing gain, but is considerably longer than can be processed using a practical sized passive (e.g. SAW) filter design. The design of the receiver takes advantage of the fact that the relatively short sequence can be despread using a practical SAW structure and is comprised of a hybrid signal processor, the front end of which contains a compact SAW matched filter and the downstream end of which is implemented using analog processing components. The matched filter removes the relatively short spreading sequence from the received signal and feeds its output to a mixer, which combines the output of the matched filter with the longer coding sequence to complete the despreading process. The despread signal is then differentially coherently decoded and coupled to an integrate and dump circuit, which accumulates the energy in successive long code symbol intervals in order to determine the value of the respective data bits.

19 Claims, 2 Drawing Sheets

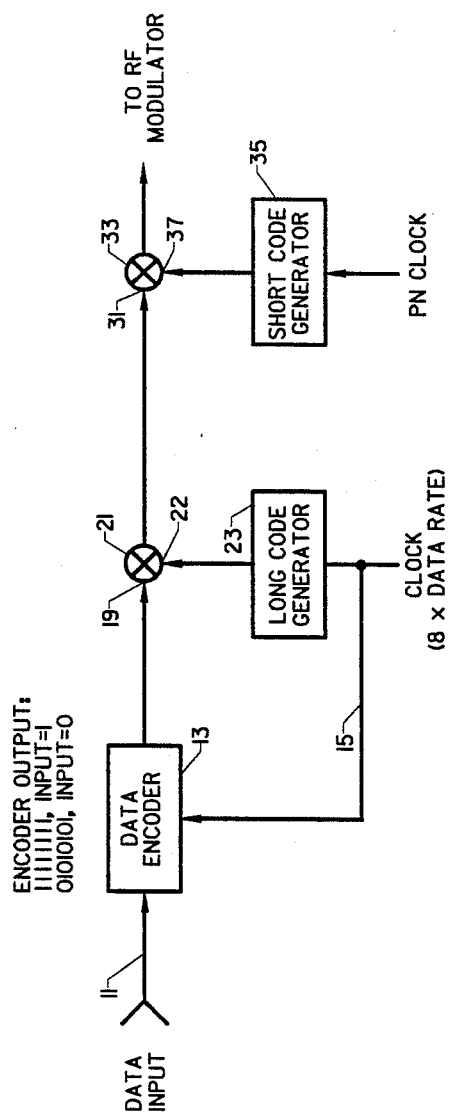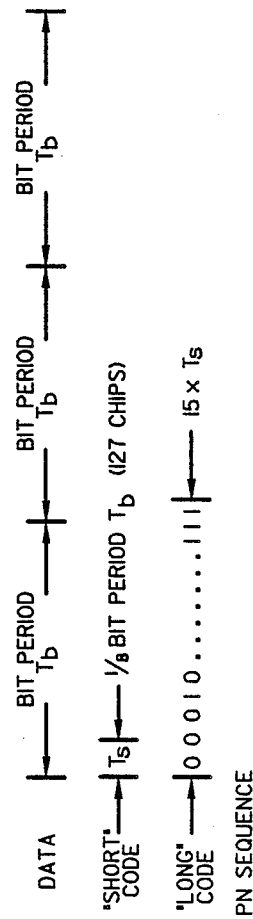

SPREAD SPECTRUM COMMUNICATION SYSTEM EMPLOYING COMPOSITE SPREADING CODES WITH MATCHED FILTER DEMODULATOR

FIELD OF THE INVENTION

The present invention relates in general to communication systems and is particularly directed to a modulation, demodulation mechanism employing composite (multiple length) spreading codes that allows for the use of practical sized matched filters (e.g. surface acoustic wave devices) in the demodulator to despread the signal and keep power consumption low.

BACKGROUND OF THE INVENTION

High performance portable communication systems commonly employ some form of spreading sequence both as a security measure and to provide robustness against multipath fades. Although the despreading and data recovery mechanism in the receiver could be implemented using a high speed digital signal processing architecture, the required hardware would be impractical in terms of power required, size and weight. On the other hand, using strictly analog passive signal processing components, such as surface acoustic wave (SAW) devices, would require a complex matched filter design of prohibitive size, particularly where very long spreading sequences are used.

SUMMARY OF THE INVENTION

In accordance with the present invention, the excessive power requirements of purely digital processing systems and the impractical size (length) that would be required to implement a SAW transversal filter for an analog signal processor are significantly reduced by means of a hybrid despread and demodulation receiver for low symbol rate communications. At the transmitter a composite coding mechanism is used to spread the data signal. This composite, or compound, spreading mechanism is formed by multiplying different length coding sequences, thereby obtaining an overall signal processing operator the duration or symbol span of which is sufficient to maintain a high signal processing gain, but is considerably longer than can be processed using a practical sized passive (e.g. SAW) filter design. The design of the receiver takes advantage of the fact that the relatively short sequence can be despread using a practical SAW structure and is comprised of a hybrid signal processor, the front end of which contains a compact SAW matched filter and the downstream end of which is implemented using digital processing components. The matched filter removes the relatively short spreading sequence from the received signal and feeds its output to a mixer, which combines the output of the matched filter with the longer coding sequence to complete the despreading process. The despread signal is then differentially decoded and coupled to an integrate and dump circuit, which measures the energy in successive symbol intervals in order to determine the value of the respective data bits.

Preferably, the bit period of the data is a first integral multiple of the length of the short coding sequence, and the length of the relatively long coding sequence is a second integral multiple of the length of the short coding sequence, longer than the bit period. In addition, the first and second integers are relatively prime numbers.

BRIEF DESCRIPTION OF THE DRAWINGS

FIG. 1 diagrammatically illustrates a composite encoding/spreading scheme in accordance with an embodiment of the present invention;

FIG. 2 shows the timing relationships among data and a pair of ("long" and "short") spreading sequences.

DETAILED DESCRIPTION

Figure 3:
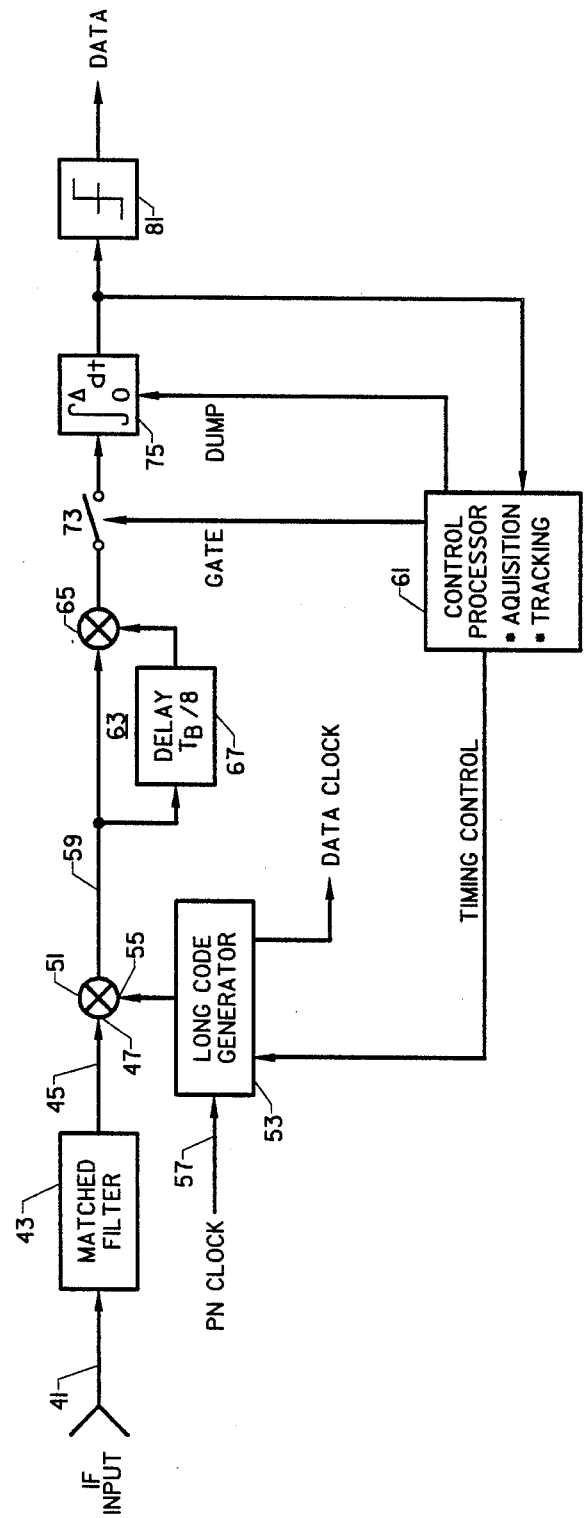
FIG. 3 diagrammatically illustrates an embodiment of a demodulator for despreading and decoding a composite spreading code.

Before describing in detail the particular improved composite code spread spectrum communication system in accordance with the present invention, it should be observed that the present invention resides primarily in a novel structural combination of conventional communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, an encoding/spreading scheme for the composite code transmitter terminal in accordance with an embodiment of the present invention is diagrammatically illustrated as comprising a data input signal line 11, over which digital data is coupled to a data encoder 13. For purposes of the present description the encoding mechanism will be assumed to be an M-ary PSK encoder, such as a differential BPSK encoder. It should be understood however, that the encoding mechanism is not limited to M-ary encoding but may be any of a variety of other types of encoding techniques customarily used in digital communication systems. In the present example, BPSK encoder 13 operates on the input data stream to produce a prescribed multi-bit pattern the bit rate of which is a multiple of (e.g. eight times) the rate of the binary data on input link 11. For a clock signal on link 15 at the representative eight times the bit rate of the data on input link 11, BPSK encoder 13 generates the output sequence 11111111 (or 00000000, depending upon the previous output) when the input data bit on link 11 is a binary "1", and the alternating one-zero sequence (01010101) when the input data bit on link 11 is a binary "0".

The multibit (X8) encoded data stream produced by encoder 13 is coupled to one input 19 of a mixer 21, to a second input 22 of which the output of a "long" spreading sequence generator 23 is applied. Like encoder 13, "long" spreading sequence generator 23 is driven by the (X8) clock on link 15, so that the pseudo random bits of its output code stream are of the same duration as the bits of the encoded differential BPSK bit stream. Mixer 21 multiplies the (BPSK) encoded data by pseudo random code of the "long" spreading sequence and supplies a first spread modulation output bit stream to a first input 31 of a downstream mixer 33, which multiplies the "long" code sequence by a "short", multichip sequence to produce a composite sequence that is applied to a downstream RF modulator (not shown) for transmission. By "long" spreading sequence is meant that the period or duration of the "long" code sequence is considerably longer (e.g. an order of magnitude or more) than the "short" spreading sequence produced by a "short" spreading sequence generator 35, the output of which is coupled to a second input 37 of mixer 33. In addition, the length of the "long" spreading sequence is equal to or longer than the period of a data bit.

More particularly, as illustrated in FIG. 2, which shows the timing relationships among the data and the two ("long" and "short") spreading sequences, in the course of the BPSK encoding process, each bit period Tb of the data is effectively subdivided into a plurality of M (eight in the present example) "short" intervals Ts. Using a 16 kbps data rate as an illustrative example, each short interval Ts has a duration on the order of 62.5/8=7.813 microseconds. The "short" spreading sequence produced by generator 35 is comprised of a sequence of N pseudo random spreading chips, e.g. 127 chips per interval Ts, which is multiplied by each of the bits of the first spread modulation output bit stream produced by mixer 21, so that during each bit interval Tb, mixer 21 produces NXM (8X127=1016) chips. In accordance with the present invention, the length of the "long" spreading sequence is fractionally longer than the bit period Tb, e.g. seven-eighths of a bit time longer than a data bit, so that the duration of the "long" sequence is fifteen times the duration of the "short" sequence. As a result, the "long" spreading sequence repeats at intervals that are incrementally offset, or delayed, by the length of a "short" sequence for successive bit periods Tb, so that the bits of the "long" sequence occur at different times for successive data bits. Consequently, the composite, or compound, sequence produced by mixer 33 has reduced spectral ripple and does not produce spectral lines that are exhibited by a repetitive short code alone. In addition, because the bit period Tb (eight "short" code intervals Ts) and the length (15Ts) of the relatively "long" coding sequence are relatively prime, bit starts will occur at all chips of the "long" code with equal frequency, so that the auto correlation function of the long code may be considered approximately implied on the autocorrelation function of the composite spread signal.

Referring now to FIG. 3, an embodiment of a demodulator for despreading and decoding the composite code produced by the output of mixer 33 in the transmitter terminal unit of FIG. 1 is diagrammatically illustrated as comprising an IF input line 41, over which a composite signal from an associated RF downconverter of the receiver terminal is coupled. As explained above, the design of the demodulator takes advantage of the fact that the relatively "short" sequence (one-eighth of a bit time) within the received composite code can be despread using a practical-sized passive device. In accordance with a preferred embodiment of the invention, despreading of the "short" sequence is accomplished by applying the composite spread signal on link 41 to a conventional surface acoustic wave matched filter 43, the electrode pattern of which effectively corresponds to the 127 chip sequence of the "short" code and thereby produces over an output line 45 a first despread signal comprised of the product of the "long" sequence and the BPSK-encoded data. The output of matched filter 43 is fed to a first input 47 of a mixer 51, which combines the first despread output signal with a replica of the "long" coding sequence produced by a "long" code generator 53, the output of which is coupled to a second input 55 of mixer 51. Long code generator is driven by a local pseudo noise clock signal on clock link 57 and is controlled by the receiver's control processor 61. Mixer 51 produces a second despread output signal on output line 59, corresponding to the BPSK encoded data absent both the "long" and the "short" sequences of the composite code, and couples the despread signal to a DPSK decoder 63, comprised of multiplier 65 and an associated delay line 67. Like matched filter 43, delay line 67 is preferably implemented as an SAW device, in order to simplify the hardware. Its delay period corresponds to the subdivision of the bit period used in the differential PSK encoding process at the transmitter which, in the present example, is one-eighth of a bit period (i.e. Tb/8). The output of multiplier 65 is a series of positive or negative pulses corresponding to the channel multipath response which repeats at a periodic rate equal to the long code chip rate (eight times the bit rate).

These decoded output pulses are coupled to an integrate and dump circuit 71, diagrammatically illustrated in FIG. 3 as a cascaded gate, or switch, 73 and an integrator 75, which gates and integrates the pulses over the eight long code chips of a bit so as to perform combining of the multipath energy. The output of integrator 75 is coupled to a hard-limiter 81, which makes a data bit decision by comparing the accumulated contents with a reference value (zero). Thus the data bit is determined to be a "0" if the energy is less than the reference, and a "1" if the accumulated energy is greater than the reference. After each bit decision, the contents of integrator 75 are cleared or dumped.

As pointed out previously, and as will be appreciated from the foregoing description, simplification of the hardware configuration of a spread spectrum demodulator is obtained in accordance with the present invention by the use of a composite spreading mechanism that permits part of the signal despreading process to be carried out by means of a practical sized, passive matched filter, thereby reducing processing complexity and power consumption. The digital hardware intensity of the demodulator may be further reduced by using analog components for other portions of the signal processor, such as mixer 51 which performs a despread multiply function, an SAW structure for delay line 67 employed in the DCPSK decoder and by using RC components for the integrate and dump circuit.

While we have shown and described an embodiment in accordance with the present invention, it is to be understood that the same is not limited thereto but is suspectible to numerous changes and modifications as known to a person skilled in the art, and we therefore do not wish to be limited to the details shown and described herein but intend to cover all such changes and modifications as are obvious to one of ordinary skill in the art.

We claim:

1. An apparatus for demodulating modulated information signals that are comprised of information signals that have been combined with a first code sequence and with a second code sequence, said second code sequence being shorter than said first code sequence, to produce modulated information signals comprising:

an input signal port to which modulated signals to be demodulated are coupled;

a matched filter, the signal response characteristics of which are defined in accordance with said second code sequence, coupled to said input signal port;

first means for generating said first code sequence; and second means, coupled to said first means and said matched filter, for combining the output of said matched filter and said first code sequence and producing therefrom output signals corresponding to said information signals, and wherein said information signals comprise digital data signals, the bit period of which is a first integral multiple of the length of said second code sequence, and wherein the length of the said first code sequence is a second integral multiple of the length of said second code sequence.

2. An apparatus according to claim 1, wherein said matched filter comprises a surface acoustic wave matched filter device.

3. An apparatus according to claim 1, wherein length of said first code sequence is longer than said bit period.

4. An apparatus according to claim 1, wherein said first and second integers are relatively prime numbers.

5. An apparatus for demodulating modulated digital data signals that are comprised of encoded digital data signals that have been multiplied by a first spreading sequence and by a second spreading sequence, said second spreading sequence being shorter than said first spreading sequence, to produce modulated digital data signals comprising:

a matched filter, the signal response characteristics of which are defined in accordance with said second spreading sequence, for receiving said modulated digital data signals and producing a first output signal absent said second spreading sequence;

first means for generating said first spreading sequence;

second means, coupled to said first means and said matched filter, for multiplying said first output signal by said first spreading sequence and producing therefrom a second output signal absent said first spreading sequence; and third means, coupled to said second means, for decoding said second output signal to produce a third decoded output signal;

fourth means, coupled to said third means, for accumulating the energy contained in said third decoded output signal; and fifth means, coupled to said fourth means, for generating recovered digital data signals in accordance with accumulated energy contents of said decoded output signals.

6. An apparatus according to claim 5, wherein said matched filter comprises a surface acoustic wave matched filter device.

7. An apparatus according to claim 5, wherein the bit period of a digital data signal is a first integral multiple of the length of said second spreading sequence.

8. An apparatus according to claim 7, wherein the length of said first spreading sequence is a second integral multiple of the length of said second spreading sequence.

9. An apparatus according to claim 8, wherein length of said first spreading sequence is longer than said bit period.

10. An apparatus according to claim 8, wherein said first and second integers are relatively prime numbers.

11. A communication system comprising:

a transmitter site including an input port to which digital information signals are applied, first means, coupled to said input port, for combining said digital information signals with a first modulation code sequence to produce a first modulation signal, second means, coupled to said first means, for combining said first modulation signal with a second modulation code sequence to produce a second modulation signal, and third means, coupled to said second means, for transmitting said second modulation signal to a receiver site, and a receiver site including a matched filter, the signal response characteristics of which are defined in accordance with said second modulation code sequence, coupled to receive said second modulation signal and producing therefrom a first output signal absent said second modulation code sequence, fourth means for generating said first modulation code sequence, and fifth means, coupled to said fourth means and said matched filter, for combining the first output signal from said matched filter with said first modulation code sequence and producing therefrom output signals corresponding to said digital information signals.

12. An apparatus according to claim 11, wherein said digital information signals have a bit period which is first integral multiple of the length of said second modulation code sequence.

13. An apparatus according to claim 12, wherein the length of said first, modulation code sequence is second integral multiple of the length of said second modulation code sequence.

14. An apparatus according to claim 13, wherein length of said first modulation code sequence is longer than said bit period.

15. An apparatus according to claim 13, wherein said first and second integers are relatively prime numbers.

16. An apparatus according to claim 11, wherein said matched filter comprises a surface acoustic wave matched filter device.

17. An apparatus for modulating digital information signals comprising:

first means for combining said digital information signals with a first modulation code sequence to produce a first modulation signals;

second means, coupled to said first means, for combining said first modulation signal with a second modulation code sequence, said second modulation code sequence being shorter than said first modulation code sequence, to produce a second modulation signal; and wherein the bit period of said digital information signals is a first integral multiple of the length of said second modulation code sequence, the length of said first modulation code sequence is a second integral multiple of the length of said second modulation code sequence, and the length of said first modulation code sequence is longer than said bit period.

18. An apparatus according to claim 17, wherein said first and second integers are relatively prime numbers.

19. An apparatus according to claim 17, wherein said first means includes means for encoding said digital information signals at an encoding rate which is a multiple of the data rate of said digital information signals, said multiple data rate corresponding to the code rate of said modulation code sequence, and means for multiplying the contents of the encoded signals by said first modulation code sequence.

* * * * *